United States Patent
Kuhn et al.

(10) Patent No.: US 6,571,208 B1
(45) Date of Patent: May 27, 2003

(54) CONTEXT-DEPENDENT ACOUSTIC MODELS FOR MEDIUM AND LARGE VOCABULARY SPEECH RECOGNITION WITH EIGENVOICE TRAINING

(75) Inventors: Roland Kuhn; Jean-Claude Junqua; Matteo Contolini, all of Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/450,392

(22) Filed: Nov. 29, 1999

(51) Int. Cl.$^7$ .......................... G01L 17/00; G01L 15/28; G01L 19/02
(52) U.S. Cl. .......................... 704/250; 704/255; 704/203
(58) Field of Search .................... 704/250, 246, 704/245, 240, 231, 232, 236, 222, 257, 255, 203

(56) References Cited

U.S. PATENT DOCUMENTS

| | | |
|---|---|---|
| 4,718,088 A | 1/1988 | Baker et al. |
| 4,817,156 A | 3/1989 | Bahl et al. |
| 4,829,577 A | 5/1989 | Kuroda et al. |
| 4,903,035 A | 2/1990 | Kropielnicki et al. |
| 5,046,099 A | 9/1991 | Nishimura |
| 5,050,215 A | 9/1991 | Nishimura |
| 5,127,055 A | 6/1992 | Larkey |
| 5,150,449 A | 9/1992 | Yoshida et al. |
| 5,170,432 A | 12/1992 | Hackbarth et al. |
| 5,233,681 A | 8/1993 | Bahl et al. |
| 5,280,562 A | 1/1994 | Bahl et al. |
| 5,293,584 A | 3/1994 | Brown et al. |
| 5,375,173 A | 12/1994 | Sanada et al. |
| 5,473,728 A | 12/1995 | Luginbuhl et al. |
| 5,522,011 A | 5/1996 | Epstein et al. |
| 5,579,436 A | 11/1996 | Chou et al. |
| 5,617,486 A | 4/1997 | Chow et al. |
| 5,651,094 A | 7/1997 | Takagi et al. |
| 5,664,059 A | 9/1997 | Zhao |
| 5,737,723 A | 4/1998 | Riley et al. |

(List continued on next page.)

OTHER PUBLICATIONS

Kuhn et al ("Improved Decision Trees For Phonetic Modeling", International Conference on Acoustics, Speech, and Signal Processing, pp. 552–555, May 1995).*

Lazarides et al ("Improving Decision Trees For Acoustic Modeling", 4th International Conference on Spoken Language, pp. 1053–1056 Oct. 1996).*

(List continued on next page.)

*Primary Examiner*—Doris H. To
*Assistant Examiner*—Daniel A. Nolan
(74) *Attorney, Agent, or Firm*—Harness, Dickey & Pierce, PLC

(57) ABSTRACT

A reduced dimensionality eigenvoice analytical technique is used during training to develop context-dependent acoustic models for allophones. The eigenvoice technique is also used during run time upon the speech of a new speaker. The technique removes individual speaker idiosyncrasies, to produce more universally applicable and robust allophone models. In one embodiment the eigenvoice technique is used to identify the centroid of each speaker, which may then be "subtracted out" of the recognition equation. In another embodiment maximum likelihood estimation techniques are used to develop common decision tree frameworks that may be shared across all speakers when constructing the eigenvoice representation of speaker space.

10 Claims, 7 Drawing Sheets

U.S. PATENT DOCUMENTS

| | | | |
|---|---|---|---|
| 5,778,342 A | | 7/1998 | Erell et al. |
| 5,787,394 A | | 7/1998 | Bahl et al. |
| 5,793,891 A | | 8/1998 | Takahashi et al. |
| 5,794,192 A | | 8/1998 | Zhao |
| 5,806,029 A | | 9/1998 | Buhrke et al. |
| 5,812,975 A | | 9/1998 | Kormori et al. |
| 5,825,978 A | | 10/1998 | Digalakis et al. |
| 5,839,105 A | | 11/1998 | Ostendorf et al. |
| 5,842,163 A | | 11/1998 | Weintraub |
| 5,864,810 A | | 1/1999 | Digalakis |
| 5,890,114 A | | 3/1999 | Yi |
| 5,895,447 A | | 4/1999 | Ittycheriah et al. |
| 6,016,471 A | * | 1/2000 | Kuhn et al. ............ 704/266 |
| 6,029,132 A | * | 2/2000 | Kuhn et al. ............ 704/259 |
| 6,138,087 A | * | 10/2000 | Budzinski ............... 704/9 |
| 6,163,769 A | * | 12/2000 | Acero et al. ............ 704/243 |
| 6,230,131 B1 | * | 5/2001 | Kuhn et al. ............ 704/266 |
| 6,233,553 B1 | * | 5/2001 | Contolini et al. ........ 704/243 |
| 6,263,309 B1 | * | 7/2001 | Nguyen et al. .......... 704/236 |
| 6,324,512 B1 | * | 11/2001 | Junqua et al. .......... 704/257 |
| 6,343,267 B1 | * | 1/2002 | Kuhn et al. ............ 704/222 |

OTHER PUBLICATIONS

Abe et al ("Hierarchial–Clustering Of Parametric Data With Application To The Parametric Eigenspace Method", International Conference on Image Processing, pp.: 118–122 Oct. 1999).*

V. Digalakis, et al., Rapid speech recognizer adaptation to new speakers, Tech. Univ. of Crete, Chania, Greece, pp. 765–768, vol. 2, Mar. 1999.

S.J. Cox, et al., Simultaneous speaker normalisation and utterance labelling using Bayesian/neural net techniques, British Telecom Res. Lab., Ipswich, UK, pp. 161–164, vol. 1, Apr. 1990.

Yunxin Zhao, An acoustic–phonetic–based speaker adaptation technique for improving speaker–independent continuous speech recognition, Speech technol. Lab., Panasonic Technol. Inc., Santa Barbara, CA, USA, pp. 380–394, vol. 2, Jul. 1994.

V. Abrash et al., Acoustic adaptation using nonlinear transformations of HMM parameters, Speech Res. & Technol. Lab., SRI Int., Menlo Park, CA, USA, pp. 729–732, vol. 2, May 1996.

R. Kuhn, et al., Eigenfaces and eigenvoices: dimensionality reduction for specialized pattern recognition, Panasonic Technol.–STL, Santa Barbara, CA, USA, pp. 71–76, Dec. 1998.

J.–L. Gauvain, et al., Improved acoustic modeling with Bayesian learning, AT&T Bell Labs., Murray Hill, NJ, USA, pp. 481–484, vol. 1, Mar. 1992.

Ming–Whei Feng, Speaker Adaptation Based on Spectral Normalization and Dynamic HMM Parameter Adaptation, GTE Laboratories Inc., IEEE, 1995, pp. 704–707.

J. McDonough, et al., Speaker–adapted training on the Switchboard Corpus, BBN Syst. & Technols., Cambridge, MA, USA, pp. 1059–1062, vol. 2, Apr. 1997.

Brian Mak, et al., Phone Clustering Using the Bhattacharyya Distance, Center for Spoken Language Understanding, Oregon Graduate Institute of Science and Technology.

W. Chou, et al., Segmental GPD Training of HMM Based Speech Recognizer, AT&T Bell Laboratories, IEEE, Sep. 1992, pp. I–473–I–476.

Alejandro Acero, et al., Speaker and Gender Normalization for Continuous–Density Hidden Markov Models, Microsoft Corporation, IEEE, Mar. 1996, pp. 342–345.

Ariane Lazarides, et al., Improving Decision Trees for Acoustic Modeling, Locus Speech Corporation, pp. 1053–1056.

Roland Kuhn, et al., Improved Decision Trees for Phonetic Modeling, Centre de recherche informatique de Montreal, IEEE, May 1995, pp. 552–555.

Yunxin Zhao, Overcoming Speaker Variability in Automatic Speech Recognition, The Speaker Adaptation Approach, pp. 191–209.

Chapters 9 and 10 of Talker Variability in Speech Processing, pp. 167–189, Academic Press, 1997.

Westwood, Robert, "Speaker Adaptation Using Eigenvoices," MPhil in Computer Speech and Language Processing, Department of Engineering, Cambridge University, No. XP–002176018, dated Aug. 31, 1999, pp. 1–52.

D. Willett et al, "Refining Tree–Based State Clustering By Means Of Formal Concept Analysis, Balanced Decision Trees And Automatically Generated Model–Sets", New York, NY. IEEE, Mar. 1999, pp. 565–568.

R. Kuhn et al, "Fast Speaker Adaptation Using A Priori Knowledge", New York, NY, IEEE, Mar. 1999, pp. 749–752.

* cited by examiner

CONTEXT-DEPENDENT ACOUSTIC MODELS FOR MEDIUM AND LARGE VOCABULARY SPEECH RECOGNITION WITH EIGENVOICE TRAINING

BACKGROUND AND SUMMARY OF THE INVENTION

Small vocabulary speech recognition systems have as their basic units the words in the small vocabulary to be recognized. For instance, a system for recognizing the English alphabet will typically have 26 models, one model per letter of the alphabet. This approach is impractical for medium and large vocabulary speech recognition systems. These larger systems typically take as their basic units, the phonemes or syllables of a language. If a system contains one model (e.g. Hidden Markov Model) per phoneme of a language, it is called a system with "context-independent" acoustic models.

If a system employs different models for a given phoneme, depending on the identity of the surrounding phonemes, the system is said to employ "context-dependent" acoustic models. An allophone is a specialized version of a phoneme defined by its context. For instance, all the instances of 'ae' pronounced before 't', as in "bat," "fat," etc. define an allophone of 'ae'.

For most languages, the acoustic realization of a phoneme depends very strongly on the preceding and following phonemes: For instance, an 'eh' preceded by a 'y' (as in "yes") is quite different from an 'eh' preceded by 's' (as in 'set'). Thus, for a system with a medium-sized or large vocabulary, the performance of context-dependent acoustic models is much better than that of context-independent models. Most practical applications of medium and large vocabulary recognition systems employ context-dependent acoustic models today.

Many context-dependent recognition systems today employ decision tree clustering to define the context-dependent, speaker-independent acoustic models. A tree-growing algorithm finds questions about the phonemes surrounding the phoneme of interest and splits apart acoustically dissimilar examples of the phoneme of interest. The result is a decision tree of yes-no questions for selecting the acoustic model that will best recognize a given allophone. Typically, the yes-no questions pertain to how the allophone appears in context (i.e., what are its neighboring phonemes).

The conventional decision tree defines for each phoneme a binary tree containing yes/no questions in the root node and in each intermediate node (children, grandchildren, etc. of the root node). The terminal nodes, or leaf nodes, contain the acoustic models designed for particular allophones of the phoneme. Thus, in use, the recognition system traverses the tree, branching 'yes' or 'no' based on the context of the phoneme in question until the leaf node containing the applicable model is identified. Thereafter the identified model is used for recognition.

Unfortunately, conventional allophone modeling can go wrong. We believe this is because current methods do not take into account the particular idiosyncrasies of each training speaker. Current methods assume that individual speaker idiosyncrasies will be averaged out if a large pool of training speakers is used. However, in practice, we have found that this assumption does not always hold. Conventional decision tree-based allophone models work fairly well when a new speaker's speech happens to resemble the speech of the training speaker population. However, conventional techniques break down when the new speaker's speech lies outside the domain of the training speaker population.

The present invention addresses the foregoing problem through a reduced dimensionality speaker space assessment technique that allows individual speaker idiosyncrasies to be rapidly identified and removed from the recognition equation, resulting in allophone models that are far more universally applicable and robust. The reduced dimensionality speaker space assessment is performed in a reduced dimensionality space that we call the eigenvoice space or eigenspace. One of the important advantages of our eigenvoice technique is speed. When a new speaker uses the recognizer, his or her speech is rapidly placed or projected into the Eigenspace derived from the training speaker population. Even the very first utterance by the new speaker can be used to place the new speaker into eigenspace. In eigenspace, the allophones may be represented with minimal influence by irrelevant factors such as each speaker's position in speaker space.

For a more complete understanding of the invention, its objects and advantages, refer to the following specification and to the accompanying drawings. In the following detailed description, two basic embodiments are illustrated. Different variations of these embodiments are envisioned as will be appreciated by those skilled in this art.

DESCRIPTION OF THE PREFERRED EMBODIMENT

Figure 1:
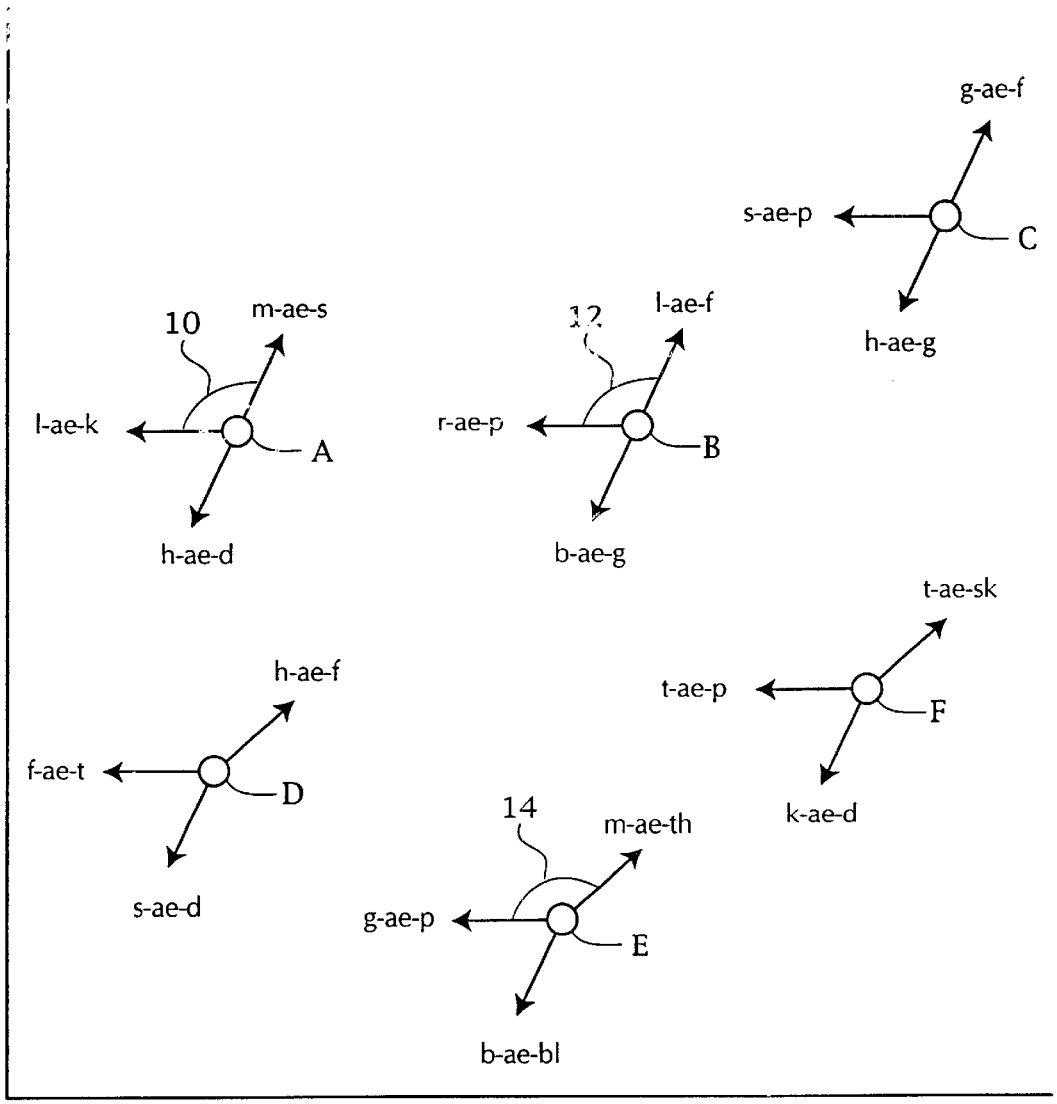
FIG. 1 is a diagrammatic illustration of speaker space useful in understanding how the centroids of a speaker population and the associated allophone vectors differ from speaker to speaker.

The techniques of the invention may be applied to a variety of different speech recognition problems. The techniques are perhaps most useful in medium and large vocabulary applications, where it is not feasible to represent each full word by its own model. Two embodiments of the invention will be described here. It will be understood that the principles of the invention may be extended to other embodiments, as well.

The first embodiment is optimized for applications where each training speaker has supplied a moderate amount of training data: for example, on the order of twenty to thirty minutes of training data per speaker. With this quantity of training data it is expected that there will be enough acoustic speech examples to construct reasonably good context independent, speaker dependent models for each speaker. If desired, speaker adaptation techniques can be used to generate sufficient data for training the context independent models. Although it is not necessary to have a full set of examples of all allophones for each speaker, the data should reflect the most important allophones for each phoneme somewhere in the data (i.e., the allophones have been pronounced a number of times by at least a small number of speakers).

The recognition system of this embodiment employs decision trees for identifying the appropriate model for each allophone, based on the context of that allophone (based on its neighboring phonemes, for example). However, unlike conventional decision tree-based modeling systems, this embodiment uses speaker-adjusted training data in the construction of the decision trees. The speaker adjusting process, in effect, removes the particular idiosyncrasies of each training speaker's speech so that better allophone models can be generated. Then, when the recognition system is used, a similar adjustment is made to the speech of the new speaker, whereby the speaker-adjusted allophone models may be accessed to perform high quality, context dependent recognition.

An important component of the recognition system of this embodiment is the eigenvoice technique by which the training speaker's speech, and the new speaker's speech, may be rapidly analyzed to extract individual speaker idiosyncrasies. The eigenvoice technique, discussed more fully below, defines a reduced dimensionality eigenspace that collectively represents the training speaker population. When the new speaker speaks during recognition, his or her speech is rapidly placed or projected into the eigenspace to very quickly determine how that speaker's speech "centroid" falls in speaker space relative to the training speakers.

As will be fully explained, the new speaker's centroid (and also each training speaker's centroid) is defined by how, on average, each speaker utters the phonemes of the system. For convenience, one can think of the centroid vector as consisting of the concatenated Gaussian mean vectors for each state of each phoneme HMM in a context independent model for a given speaker. However, the concept of "centroid" is scalable and it depends on how much data is available per training speaker. For instance, if there is enough training data to train a somewhat richer speaker dependant model for each speaker (such as a diphone model), then the centroid for each training speaker could be the concatenated Gaussian means from this speaker dependent diphone model. Of course, other models such as triphone models and the like, may also be implemented.

FIG. 1 illustrates the concept of the centroids by showing diagrammatically how six different training speakers A–F may pronounce phoneme 'ae' in different contexts. FIG. 1 illustrates a speaker space that is diagrammatically shown for convenience as a two-dimensional space in which each speaker's centroid lies in the two-dimensional space at the center of the allophone vectors collected for that speaker. Thus, in FIG. 1, the centroid of speaker A lies at the origin of the respective allophone vectors derived as speaker A uttered the following words: "mass", "lack", and "had". Thus the centroid for speaker A contains information that in rough terms represents the "average" phoneme 'ae' for that speaker.

By comparison, the centroid of speaker B lies to the right of speaker A in speaker space. Speaker B's centroid has been generated by the following utterances: "laugh", "rap," and "bag". As illustrated, the other speakers C–F lie in other regions within the speaker space. Note that each speaker has a set of allophones that are represented as vectors emanating from the centroid (three allophone vectors are illustrated in FIG. 1). As illustrated, these vectors define angular relationships that are often roughly comparable between different speakers. Compare angle 10 of speaker A with angle 12 of speaker B. However, because the centroids of the respective speakers do not lie coincident with one another, the resulting allophones of speakers A and B are not the same. The present invention is designed to handle this problem by removing the speaker-dependent idiosyncrasies characterized by different centroid locations.

While the angular relationships among allophone vectors are generally comparable among speakers, that is not to say that the vectors are identical. Indeed, vector lengths may vary from one speaker to another. Male speakers and female speakers would likely have different allophone vector lengths from one another. Moreover, there can be different angular relationships attributable to different speaker dialects. In this regard, compare angle 14 of speaker E with angle 10 of speaker A. This angular difference would be reflective, for example, where speaker A speaks a northern United States dialect whereas speaker E speaks a southern United States dialect.

These vector lengths and angular differences aside, the disparity in centroid locations represents a significant speaker-dependant artifact that conventional context dependent recognizers fail to address. As will be more fully explained below, the present invention provides a mechanism to readily compensate for the disparity in centroid locations and also to compensate for other vector length and angular differences.

Figure 2:
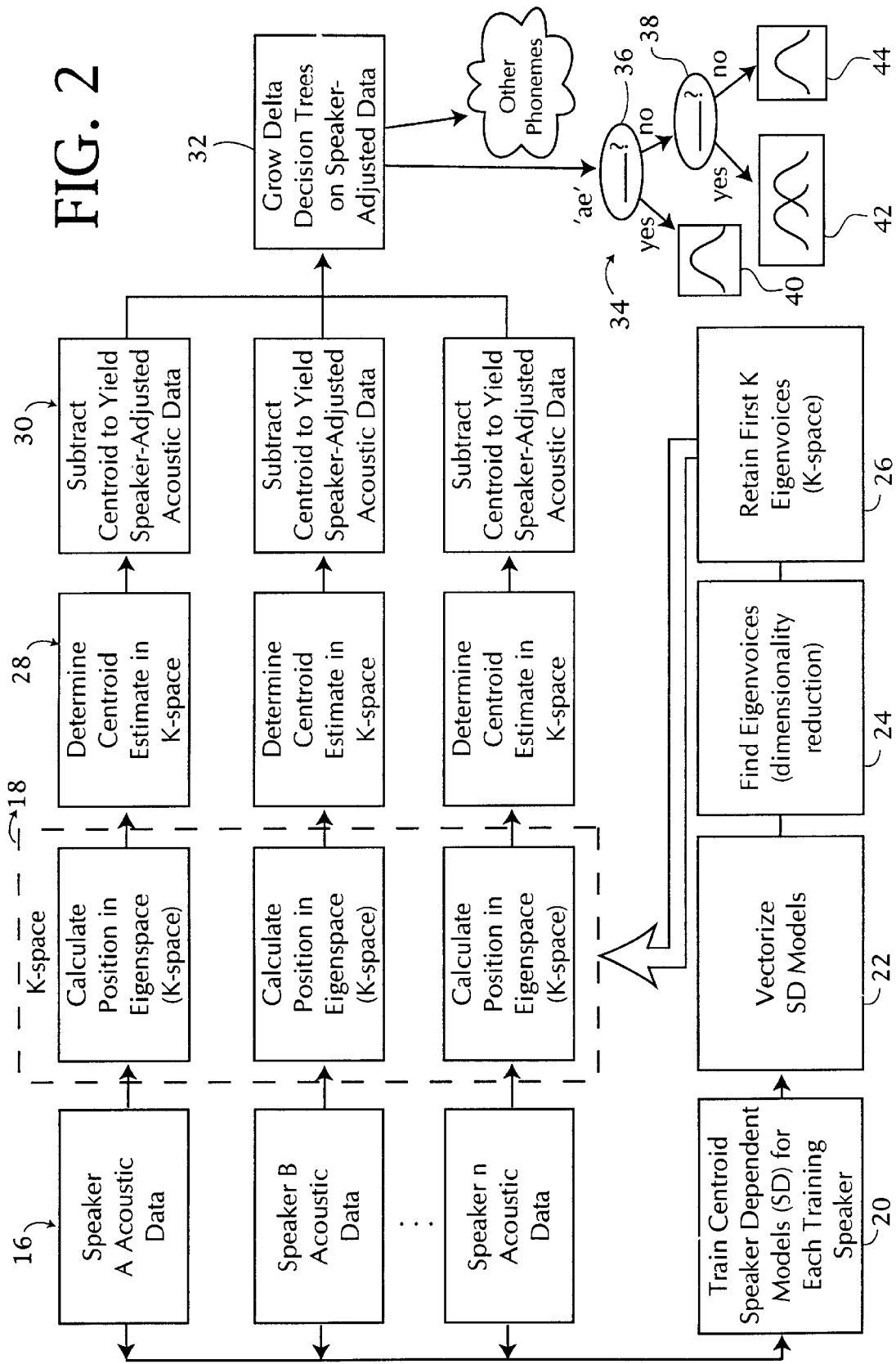
FIG. 2 is a block diagram of a first presently preferred embodiment called the eigen centroid plus delta tree embodiment.
Figure 3:
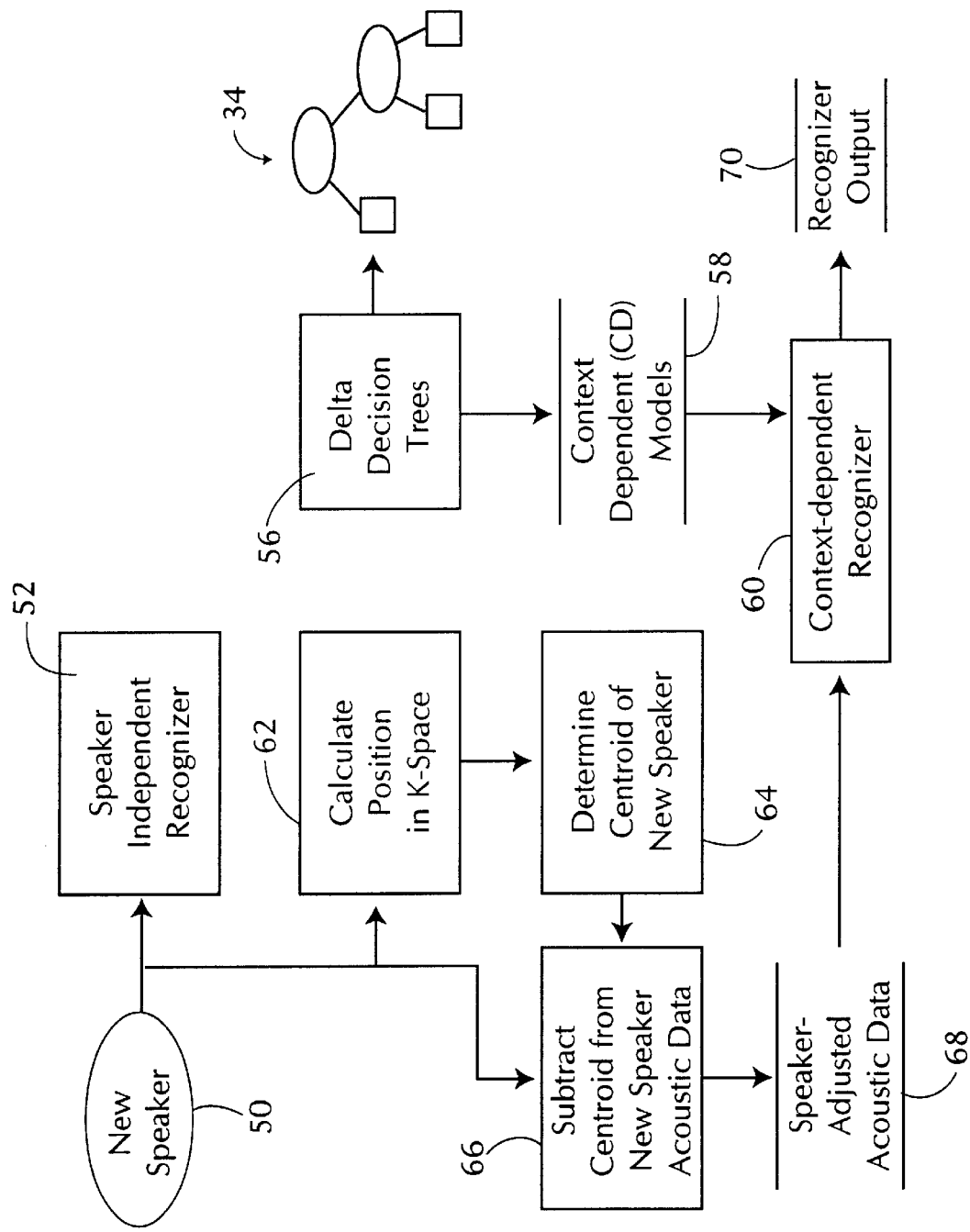
FIG. 3 illustrates one embodiment of a speech recognizer that utilizes the delta decision trees developed by the embodiment illustrated in FIG. 2.
Figure 4:
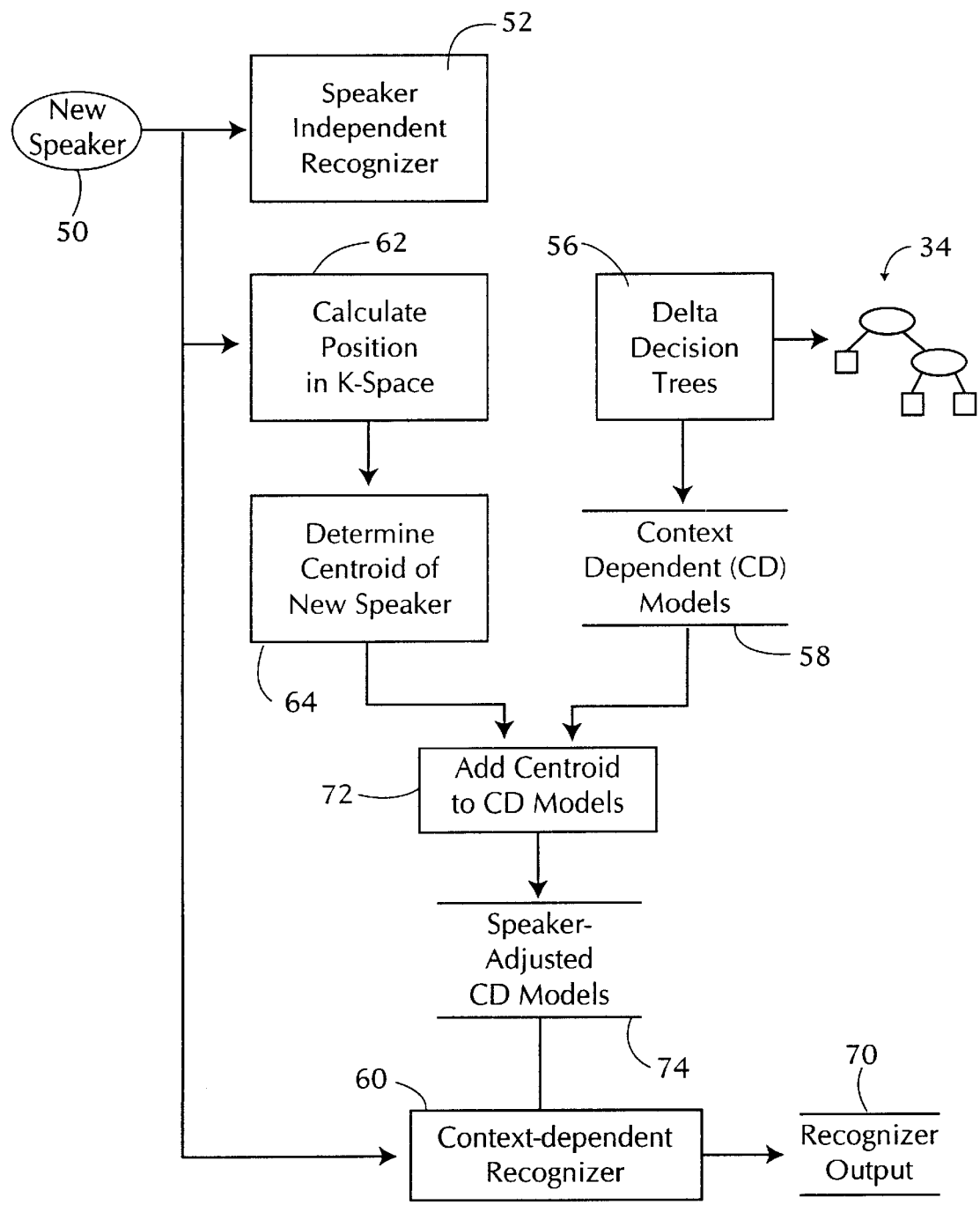
FIG. 4 is another embodiment of speech recognizer that also uses the delta decision trees generated by the embodiment of FIG. 2.

FIG. 2 illustrates a presently preferred first embodiment that we call the eigen centroid plus delta tree embodiment. More specifically, FIG. 2 shows the preferred steps for training the delta trees that are then used by the recognizer. FIGS. 3 and 4 then show alternate embodiments for use of that recognizer with speech supplied by a new speaker.

Referring to FIG. 2, the delta decision trees used by this embodiment may be grown by providing acoustic data from a plurality of training speakers, as illustrated at 16. The acoustic data from each training speaker is projected or placed into an eigenspace 18. In the presently preferred embodiment the eigenspace can be truncated to reduce its size and computational complexity. We refer here to the reduced size eigenspace as K-space.

One procedure for creating eigenspace 18 is illustrated by steps 20–26. The procedure uses the training speaker acoustic data 16 to generate speaker dependent (SD) models for each training speaker, as depicted at step 20. These models are then vectorized at step 22. In the presently preferred embodiment, the speaker dependent models are vectorized by concatenating the parameters of the speech models of each speaker. Typically Hidden Markov Models are used, resulting in a supervector for each speaker that may comprise an ordered list of parameters (typically floating point numbers) corresponding to at least a portion of the parameters of the Hidden Markov Models for that speaker. The parameters may be organized in any convenient order. The order is not critical; however, once an order is adopted it must be followed for all training speakers.

Next, a dimensionality reduction step is performed on the supervectors at step 24 to define the eigenspace. Dimensionality reduction can be effected through any linear transformation that reduces the original high-dimensional supervectors into basis vectors. A non-exhaustive list of dimensionality reduction techniques includes: Principal Component Analysis (PCA), Independent Component Analysis (ICA), Linear Discriminate Analysis (LDA), Factor Analysis (FA) and Singular Value Decomposition (SVD).

The basis vectors generated at step 24 define an eigenspace spanned by the eigenvectors. Dimensionality reduction yields one eigenvector for each one of the training speakers. Thus if there are n training speakers, the dimensionality reduction step 24 produces n eigenvectors. These eigenvectors define what we call eigenvoice space or eigenspace.

The eigenvectors that make up the eigenspace each represent a different dimension across which different speakers may be differentiated. Each supervector in the original training set can be represented as a linear combination of these eigenvectors. The eigenvectors are ordered by their importance in modeling the data: the first eigenvector is more important than the second, which is more important than the third, and so on.

Although a maximum of n eigenvectors is produced at step 24, in practice, it is possible to discard several of these eigenvectors, keeping only the first K eigenvectors. Thus at step 26 we optionally extract K of the n eigenvectors to comprise a reduced parameter eigenspace or K-space. The higher order eigenvectors can be discarded because they typically contain less important information with which to discriminate among speakers. Reducing the eigenvoice space to fewer than the total number of training speakers helps to eliminate noise found in the original training data, and also provides an inherent data compression that can be helpful when constructing practical systems with limited memory and processor resources.

Having constructed the eigenspace 18, the acoustic data of each individual training speaker is projected or placed in eigenspace as at 28. The location of each speaker's data in eigenspace (K-space) represents each speaker's centroid or average phoneme pronunciation. As illustrated in FIG. 1, these centroids may be expected to differ from speaker to speaker. Speed is one significant advantage of using the eigenspace technique to determine speaker phoneme centroids.

The presently preferred technique for placing each speaker's data within eigenspace involves a technique that we call the Maximum Likelihood Estimation Technique (MLED). In practical effect, the Maximum Likelihood Technique will select the supervector within eigenspace that is most consistent with the speaker's input speech, regardless of how much speech is actually available.

To illustrate, assume that the speaker is a young female native of Alabama. Upon receipt of a few uttered syllables from this speaker, the Maximum Likelihood Technique will select a point within eigenspace that represents all phonemes (even those not yet represented in the input speech) consistent with this speaker's native Alabama female accent.

The Maximum Likelihood Technique employs a probability function Q that represents the probability of generating the observed data for a predefined set of Hidden Markov Models. Manipulation of the probability function Q is made easier if the function includes not only a probability term P but also the logarithm of that term, log P. The probability function is then maximized by taking the derivative of the probability function individually with respect to each of the eigenvalues. For example, if the eigenspace is on dimension 100 this system calculates 100 derivatives of the probability function Q, setting each to zero and solving for the respective eigenvalue W.

The resulting set of Ws, so obtained, represents the eigenvalues needed to identify the point in eigenspace that corresponds to the point of maximum likelihood. Thus the set of Ws comprises a maximum likelihood vector in eigenspace. This maximum likelihood vector may then be used to construct a supervector that corresponds to the optimal point in eigenspace.

In the context of the maximum likelihood framework of the invention, we wish to maximize the likelihood of an observation O with regard to a given model. This may be done iteratively by maximizing the auxiliary function Q presented below.

$$Q(\lambda, \hat{\lambda}) = \sum_{\theta \in states} P(O, \theta | \lambda) \log[P(O, \theta | \hat{\lambda})]$$

where $\lambda$ is the model and $\hat{\lambda}$ is the estimated model.

As a preliminary approximation, we might want to carry out a maximization with regards to the means only. In the context where the probability P is given by a set of HMMs, we obtain the following:

$$Q(\lambda, \hat{\lambda}) =$$

$$const - \frac{1}{2} P(O | \lambda) \sum_{\substack{states \\ in \lambda}}^{S_\lambda} \sum_{\substack{mixt \\ gauss \\ in S}}^{M_s} \sum_{\substack{time \\ t}}^{T} \{\gamma_m^{(s)}(t)[n \log(2\pi) + \log|C_m^{(s)}| + h(o_t, m, s)]\}$$

where:

$$h(o_t, m, s) = (o_t - \hat{\mu}_m^{(s)})^T C_m^{(s)-1} (o_t - \hat{\mu}_m^{(s)})$$

and let:

$o_t$ be the feature vector at time t
$C_m^{(s)-1}$ be the inverse covariance for mixture Gaussian m of state s
$\hat{\mu}_m^{(s)}$ be the approximated adapted mean for state s, mixture component m
$\gamma_m^{(s)}(t)$ be the P(using mix Gaussian m|$\lambda$,$o_t$)

Suppose the Gaussian means for the HMMs of the new speaker are located in eigenspace. Let this space be spanned by the mean supervectors $\bar{\mu}_j$ with j=1 . . . E, $$\bar{\mu}_j = \begin{bmatrix} \bar{\mu}_1^{(1)}(j) \\ \bar{\mu}_2^{(1)}(j) \\ \vdots \\ \bar{\mu}_m^{(s)}(j) \\ \vdots \\ \bar{\mu}_{M_{S_2}}^{(S_2)}(j) \end{bmatrix}$$

where $\bar{\mu}_m^{(s)}(j)$ represents the mean vector for the mixture Gaussian m in the state s of the eigenvector (eigenmodel) j.

Then we need:

$$\hat{\mu} = \sum_{j=1}^{E} w_j \bar{\mu}_j$$

The $\bar{\mu}$ are orthogonal and the $w_j$ are the eigenvalues of our speaker model. We assume here that any new speaker can be modeled as a linear combination of our database of observed speakers. Then $$\hat{\mu}_m^{(s)} = \sum_{j=1}^{E} w_j \bar{\mu}_m^{(s)}(j)$$

with s in states of λ, m in mixture Gaussians of M.

Since we need to maximize Q, we just need to set $$\frac{\partial Q}{\partial w_e} = 0, e = 1 \ldots E.$$

(Note that because the eigenvectors are orthogonal, $$\frac{\partial w_i}{\partial w_j} = 0, i \neq j \ldots)$$

Hence we have $$\frac{\partial Q}{\partial w_e} = 0 = \sum_{\substack{states \\ in\ \lambda}}^{S_\lambda} \sum_{\substack{mixt \\ gauss \\ in\ S}}^{M_s} \sum_{time}^{T} \left\{ \frac{\partial}{\partial w_e} \gamma_m^{(s)}(t) h(o_t, s) \right\}, e = 1 \ldots E.$$

Computing the above derivative, we have:

$$0 = \sum_s \sum_m \sum_t \gamma_m^{(s)}(t) \left\{ -\bar{\mu}_m^{(s)T}(e) C_m^{(s)-1} o_t + \sum_{j=1}^{E} w_j \bar{\mu}_m^{(s)T}(j) C_m^{(s)-1} \bar{\mu}_m^{(s)}(e) \right\}$$

from which we find the set of linear equations $$\sum_s \sum_m \sum_t \gamma_m^{(s)}(t) \bar{\mu}_m^{(s)T}(e) C_m^{(s)-1} o_t =$$

$$\sum_s \sum_m \sum_t \gamma_m^{(s)}(t) \sum_{j=1}^{E} w_j \bar{\mu}_m^{(s)T}(j) C_m^{(s)-1} \bar{\mu}_m^{(s)}(e), e = 1 \ldots E.$$

Once the centroids for each speaker have been determined, they are subtracted at step 30 to yield speaker-adjusted acoustic data. Referring to FIG. 1, this centroid subtraction process will tend to move all speakers within speaker space so that their centroids are coincident with one another. This, in effect, removes the speaker idiosyncrasies, leaving only the allophone-relevant data.

After all training speakers have been processed in this fashion, the resulting speaker-adjusted training data is used at step 32 to grow delta decision trees as illustrated diagrammatically at 34. A decision tree is grown in this fashion for each phoneme. The phoneme 'ae' is illustrated at 34. Each tree comprises a root node 36 containing a question about the context of the phoneme (i.e., a question about the phoneme's neighbors or other contextual information). The root node question may be answered either "yes" or "no", thereby branching left or right to a pair of child nodes. The child nodes can contain additional questions, as illustrated at 38, or a speech model, as illustrated at 40. Note that all leaf nodes (nodes 40, 42, and 44) contain speech models. These models are selected as being the models most suited for recognizing a particular allophone. Thus the speech models at the leaf nodes are context-dependent.

After the delta decision trees have been developed, as illustrated in FIG. 1, the system may be used to recognize the speech of a new speaker. Two recognizer embodiments will now be described with reference to FIGS. 3 and 4. The recognizer embodiments different essentially in whether the new speaker centroid is subtracted from the acoustic data prior to context-dependent recognition (FIG. 3); or whether the centroid information is added to the context-dependent models prior to context-dependent recognition.

Referring to FIG. 3, the new speaker 50 supplies an utterance that is routed to several processing blocks, as illustrated. The utterance is supplied to a speaker-independent recognizer 52 that functions simply to initiate the MLED process.

Before the new speaker's utterance is submitted to the context-dependent recognizer 60, the new speaker's centroid information is subtracted from the speaker's acoustic data. This is accomplished by calculating the position of the new speaker within the eigenspace (K-space) as at 62 to thereby determine the centroid of the new speaker as at 64. Preferably the previously described MLED technique is used to calculate the position of the new speaker in K-space.

Having determined the centroid of the new speaker, the centroid data is subtracted from the new speaker's acoustic data as at 66. This yields speaker-adjusted acoustic data 68 that is then submitted to the context-dependent recognizer 60. At 56 the context-dependent recognizer 60 utilizes delta decision trees 34 to access context-dependent models 58. The context-dependent models 58 are employed by the context-dependent recognizer 60 to obtain recognizer output 70.

The alternate embodiment illustrated at FIG. 4 works in a somewhat similar fashion. The new speaker's utterance is submitted to the speaker-independent recognizer 52 as before, to initiate the MLED process. Of course, if the MLED process is not being-used in a particular embodiment, the speaker-independent recognizer may not be needed.

Figure 5:
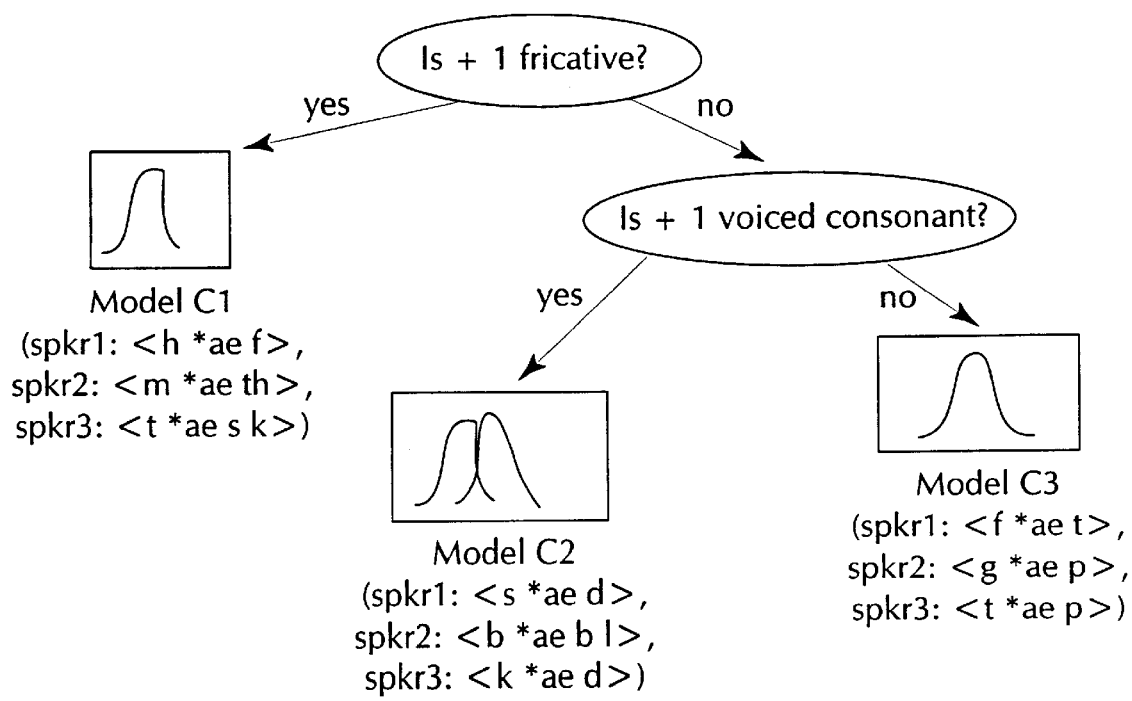
FIG. 5 illustrates how a delta tree might be constructed using the speaker-adjusted data generated by the embodiment of FIG. 2.
Figure 6:
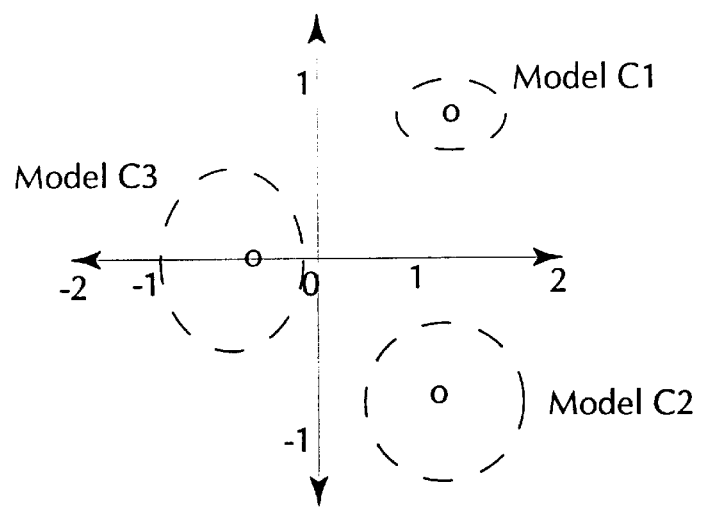
FIG. 6 shows the grouping of speaker-adjusted data in acoustic space corresponding to the delta tree of FIG. 5.

Meanwhile, the new speaker's utterance is placed into eigenspace as at step 62 to determine the centroid of the new speaker as at 64. Further, the delta decision trees 34 are used at 56 to access context-dependent models 58. The centroid information is then added to the context-dependent models as at 72 to yield a set of speaker-adjusted context-dependent models 74. These speaker-adjusted models are then used by the context-dependent recognizer 60 in producing the recognizer output 70. Table I below shows how exemplary data items for three speakers may be speaker-adjusted by subtracting out the centroid. All data items in the table are pronunciations of the phoneme 'ae' (in a variety of contexts). FIG. 5 then shows how a delta tree might be constructed using this speaker-adjusted data. FIG. 6 then shows the grouping of the speaker-adjusted data in acoustic space. In FIG. 6 +1 means next phoneme; the fricatives are the set of phonemes {f, h, s, th, . . . }; voiced consonants are {b, d, g, . . . }.

TABLE 1

| Spkr1: centroid = (2,3) | | | | |
|---|---|---|---|---|
| "half" = > | <h *ae f> | (3,4) | −(2,3) | =(1,1) |
| "sad" = > | <s *ae d> | (2,2) | −(2,3) | =(0,−1) |
| "fat" = > | <f *ae t> | (1.5,3) | −(2,3) | =(−0.5,0) |
| Spkr2: centroid = (7,7) | | | | |
| "math" = > | <m *ae th> | (8,8) | −(7,7) | =(1,1) |
| "babble" = > | <b *ae b l> | (7,6) | −(7,7) | =(0,−1) |
| "gap" = > | <g *ae p> | (6.5,7) | −(7,7) | =(−0.5,0) |

TABLE 1-continued

Spkr3: centroid = (10,2)

| "task" => | <t *ae s k> | (11,3)  | −(10,2) | =(1,1)    |
|-----------|-------------|---------|---------|-----------|
| "cad" =>  | <k *ae d>   | (10,1)  | −(10,2) | =(0,−1)   |
| "tap" =>  | <t *ae p>   | (9.5,2) | −(10,2) | =(−0.5,0) |

If desired, standard deviations as well as means may be used in the speaker-adjustment process. This would be done, for example, by imposing a unit variance condition (as in cepstral normalization). After speaker-dependent centroid training, the supervectors submitted to MLED would contain standard deviations as well as means. For each training data item, after subtraction of the phoneme state centroid from each data item, the item would be further adjusted by dividing by centroid standard deviations. This would result in even more accurate pooling of allophone data by the trees. There would be some computational costs at run time when using this technique, because the speaker-adjustment of incoming frames would be slightly more complex.

Figure 7:
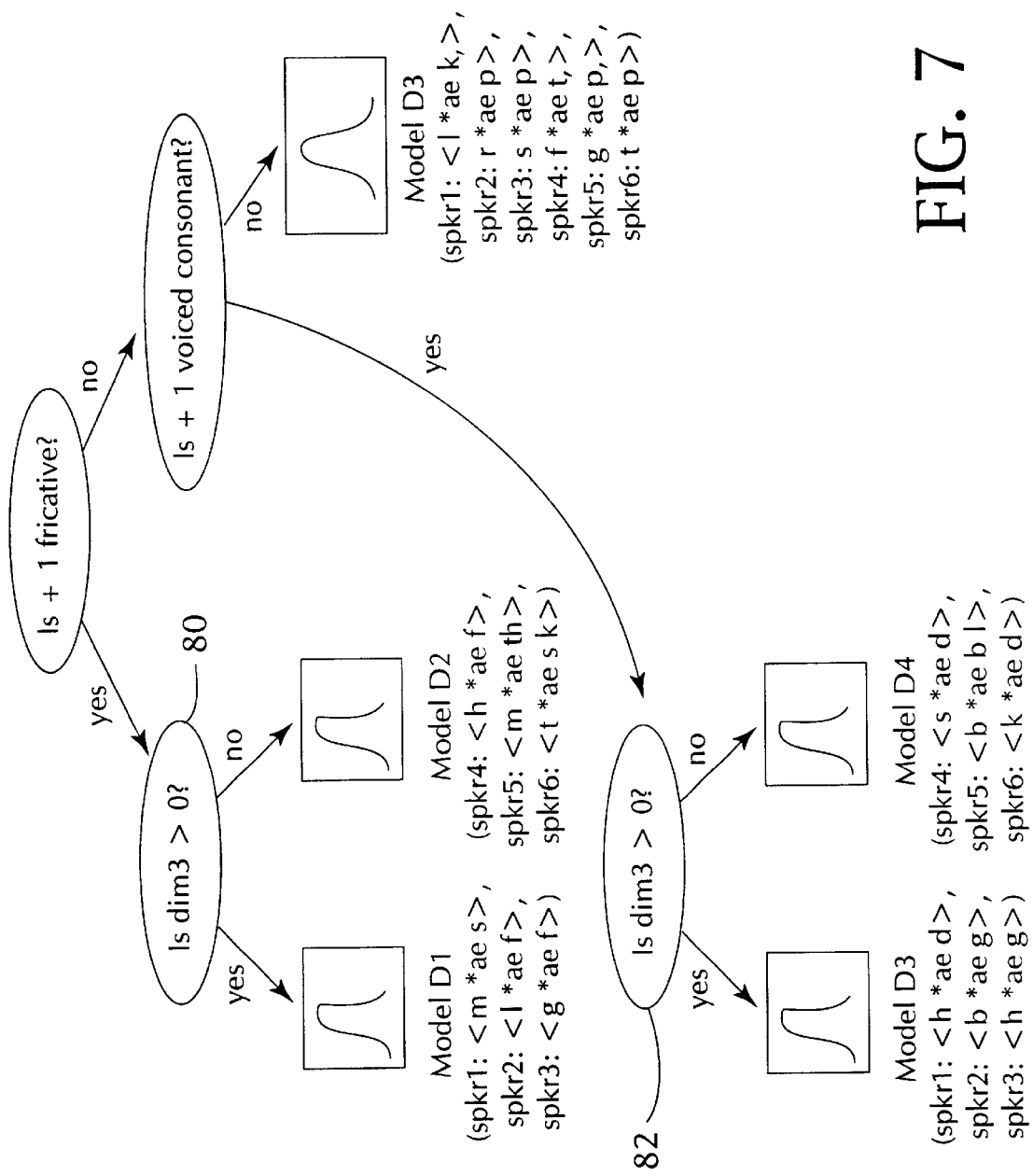
FIG. 7 illustrates an exemplary delta decision tree that includes questions about the eigenspace dimensions.

As previously noted, co-articulation can be affected by speaker type in a way that causes the direction of the allophone vectors to differ. This was illustrated in FIG. 1 wherein the angular relationships of offset vectors differed depending on whether the speaker was from the north or from the south. This phenomenon may be taken into account by including decision tree questions about the eigen dimensions. FIG. 7 shows an exemplary delta decision tree that includes questions about the eigen dimensions in determining which model to apply to a particular allophone. In FIG. 7, questions 80 and 82 are eigen dimension questions. The questions ask whether a particular eigen dimension (in this case dimension 3) is greater than zero. Of course, other questions can also be asked about the eigen dimension.

Another embodiment of the invention will now be described in connection with FIG. 8. This embodiment is suited for applications in which there is a sufficient quantity of data per speaker to train reasonably accurate speaker-dependent models. In this embodiment it is not necessary to ascertain the centroids of each speaker.

However, in order to employ the eigenvoice technique, it is necessary to have a set of supervectors (one from each training speaker-dependent model). These supervectors must have the same dimension and must be aligned in the same sense that the index i must represent the same parameter across all speaker-dependent models.

Therefore, to grow a good context-dependent allophone tree for a given phoneme that is sharable across speakers, this embodiment pools data across speakers, but keeps track of which data item came from which speaker. The maximum likelihood estimation (MLE) criterion for choosing a question is thus extended to accumulate an overall score for each test question, while separately evaluating and retaining the scores for individual speakers. FIG. 8 illustrates the technique.

Figure 8:
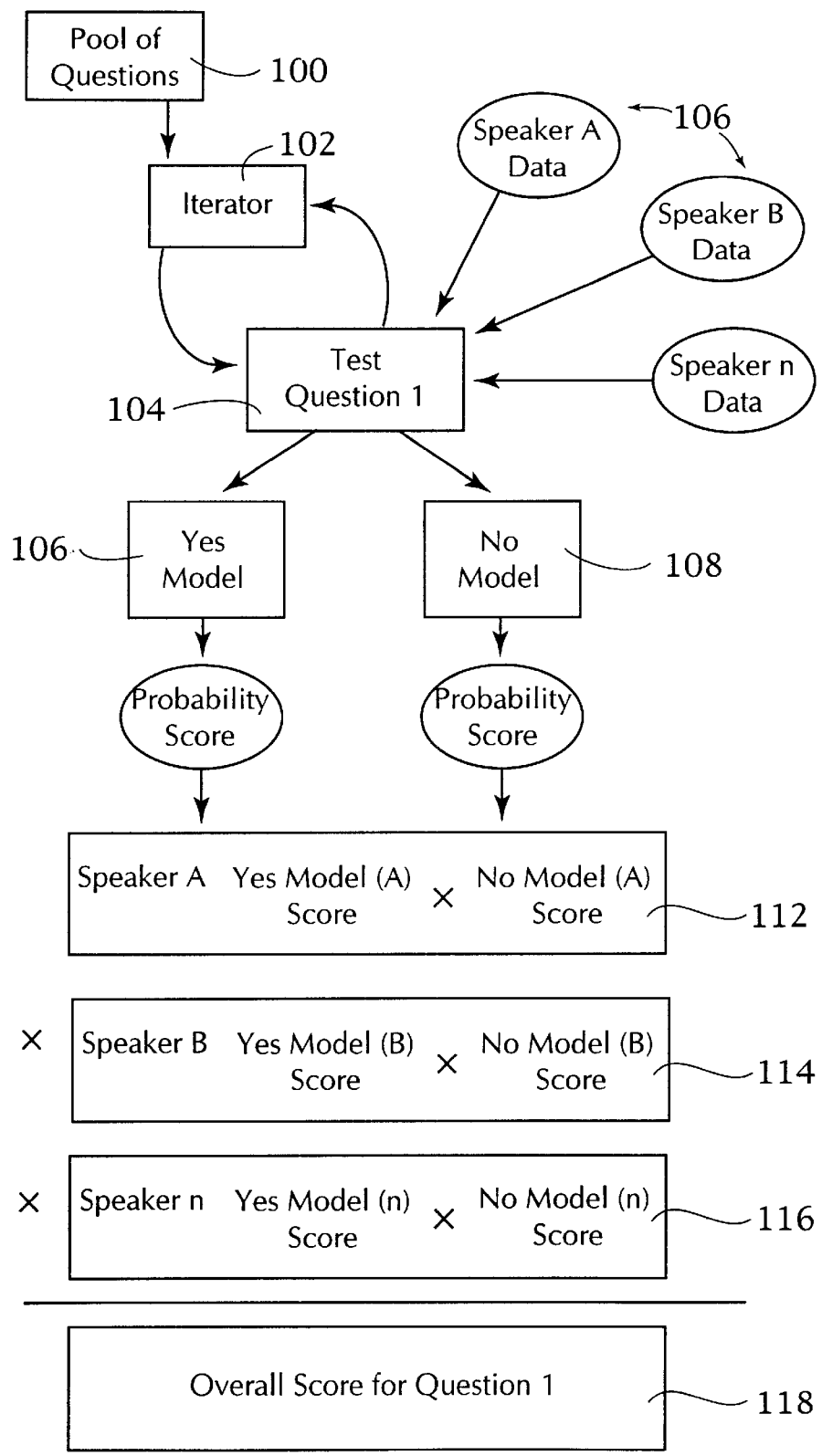
FIG. 8 illustrates a second embodiment of the invention, useful in applications where there is a more complete quantity of data per speaker.

Referring to FIG. 8, the decision tree structure is grown by providing a pool of questions 100. These questions are individually tested by the tree-growing algorithm, to determine which questions best define the structure of the allophone trees.

The pool of questions is examined, one question at a time, through an iterative technique. Thus the system of FIG. 8 includes iterator 102 for selecting a question from pool 100 so that it may be tested. The current question under test is illustrated at 104.

Recall that each test question may relate in some way to the context in which a particular phoneme occurs. Thus the test question might be, for example, whether the given phoneme is preceded by a fricative. The tree-growing algorithm grows individual trees for each phoneme, starting with a root node question and proceeding to additional nodes, as needed until the allophones of that phoneme are well-represented by the tree structure. Selection of the root node question and any intermediate node questions proceeds as illustrated in FIG. 8.

The procedure for selecting test questions works by assuming that the current question under evaluation (question 104) has been chosen for that node of the tree. Speaker data from the training speakers 106 are evaluated by the test question 104 to thereby split the speech data into two portions: a portion that answered "yes" to the test question and a portion that answered "no" to the test question. Speech models are then constructed using the test speaker data. Specifically, a "yes" model 106 and a "no" model 108 are constructed for each speaker. This is different from the conventional procedure in which data for all 15 speakers is pooled and for a given question, one "yes" and one "no" model are trained from the pooled data. The models are trained by training acoustic features on all the speech data examples that answer "yes" to the test question and similarly training another set of acoustic features on the data that answers "no" to the test question.

After having generated a "yes" model 106 and a "no" model 108 for each speaker, the system calculates the probability score of all the "yes" data given the "yes" model 106 and also calculates the probability score of all the "no" data given the "no" model 108. A high probability score means that the constructed model is doing a good job of recognizing its portion of the training data. A low probability score means that the model, while perhaps the best model that could be created using the training data, is not doing a good job of recognizing the phoneme in question.

The probability scores are assessed to compute the overall score for the test question 104. The computation proceeds as illustrated in FIG. 8 as follows. First the respective probability scores for the "yes" model and the "no" model are computed for a first training speaker (speaker A). These scores are multiplied together to give a cumulative product score indicative of how well the models worked with speaker A. This is illustrated at 112. The same procedure is then followed for the remaining training speakers, one speaker at a time, as illustrated at 114 and 116. Finally, when all of the training speakers have been taken into account, an overall score is computed by multiplying the resultant products derived from individual speakers. Thus the products ascertained at steps 112, 114 and 116 are multiplied together to yield an overall score for the test question at 118.

Having generated an overall score for the first test question, iterator 102 stores the overall score results and then draws a second question from the pool of questions 100 for testing in the same fashion. When all questions in the pool have been tested, the question that gave the best overall score is selected for that node of the decision tree.

After the root node of the decision tree has been determined as described above, the iterator 102 may continue to assess whether further intermediate nodes produce sufficient improvements in allophone recognition to warrant adding additional nodes to the tree. Ultimately, when the tree is grown in this fashion, the leaf nodes contain the models that best "recognize" the allophones of a particular phoneme.

After the decision tree structures have been identified through the foregoing procedure, the eigenvoice technique may now be applied. If a single Gaussian per leaf node is sufficient to represent the allophones, the allophonic speaker-dependent models are trained using the shared tree structure to obtain a set of supervectors which are then used to construct the eigenspace through dimensionality reduction. With training now complete, the online step is a simple MLED estimation of the eigenvoice coefficients. Multiple Gaussian models are slightly more complicated because the question of alignment must be addressed. That is, whereas it is known that leaf node N of speaker dependent model 1 and leaf node N of speaker dependent model 2 represent the same allophone, it is not certain that Gaussian i of leaf N in speaker dependent model 1 represents the same phenomenon as Gaussian i of leaf N in speaker dependent model 2. One way to address this issue is to find a centroid for each leaf of the speaker-dependent model and then speaker-adjust the data reaching all leaves. One would then pool data for a given leaf across speaker-dependent models and calculate shared delta Gaussians. At run time, MLED would yield estimates of all leaf centroids, which can then be subtracted from the new speaker's data before it is evaluated against the delta Gaussians.

From the foregoing it will be appreciated that the present invention advantageously uses eigenvoice training techniques to develop context-dependent acoustic models for medium and large vocabulary speech recognition systems. While the invention has been described in its presently preferred embodiments, it will be understood that the invention can be extended to other embodiments without departing from the spirit of the invention as set forth in the appended claims.

What is claimed is:

1. A method for developing context-dependent models for automatic speech recognition, comprising:
    generating an eigenspace to represent a training speaker population;
    providing a set of acoustic data for at least one training speaker and representing said acoustic data in said eigenspace to determine at least one allophone centroid for said training speaker;
    subtracting said centroid from said acoustic data to generate speaker-adjusted acoustic data for said training speaker;
    using said speaker-adjusted acoustic data to grow at least one decision tree having leaf nodes containing context-dependent models for different allophones.

2. The method of claim 1 further comprising using a set of acoustic data for a plurality of training speakers to generate said speaker-adjusted acoustic data for each of said plurality of training speakers.

3. The method of claim 1 wherein said eigenspace is generated by constructing supervectors based on speech from said training speaker population and performing dimensionality reduction upon said supervectors to define a reduced dimensionality space that spans said training speaker population.

4. A method of performing speech recognition using said context-dependent models developed as recited in claim 1, comprising:
    providing speech data from a new speaker;
    using said eigenspace to determine at least one new speaker centroid of a new speaker and subtracting said new speaker centroid from said speech data from said new speaker to generate speaker-adjusted data; and
    applying said speaker-adjusted data to a speech recognizer employing said context-dependent models.

5. A method of performing speech recognition using said context-dependent models developed as recited in claim 1, comprising:
    providing speech data from a new speaker;
    using said eigenspace to determine at least one new speaker centroid of a new speaker and adding said new speaker centroid to said context-dependent models to generate new speaker-adjusted context-dependent models; and
    applying said speech data to a speech recognizer employing said new speaker-adjusted context-dependent models.

6. The method of claim 1, wherein the decision tree has at least one non-leaf node containing an eigen dimension question.

7. A method of training context-dependent models for automatic speech recognition, comprising:
    constructing a decision tree framework of yes-no questions having leaf nodes for storing context-dependent allophone models;
    training a set of speaker-dependent acoustic models for a plurality of training speakers and using said decision tree framework to construct a plurality of decision trees for said training speakers, storing the speaker-dependent acoustic models for each training speaker in the leaf nodes of the respective decision tree;
    constructing an eigenspace by using said set of decision trees to generate supervectors that are subsequently transformed through dimensionality reduction.

8. The method of claim 7, wherein the yes-no questions include at least one eigen dimension question.

9. A method of constructing a decision tree for storing context-dependent models for automatic speech recognition, comprising:
    providing a pool of yes-no questions to identify different contexts of sound units;
    providing a corpus of test speaker data;
    for a plurality of test speakers represented by said corpus and for a plurality of questions in said pool, iteratively performing the following steps (a) through (e) inclusive:
        (a) selecting a question from said pool;
        (b) constructing a first yes model and a first no model for said selected question using speaker data from a first one of said test speakers;
        (c) computing a first product of the probability scores for said first yes model and said first no model;
        (d) constructing a second yes model and a second no model for said selected question using speaker data from a second one of said test speakers;
        (d) computing a second product of the probability scores for said second yes model and said second no model;
        (e) computing an overall score for said selected question by computing an overall product that includes the product of said first and second products;
    growing a decision tree having nodes populated with different questions selected from the pool such that at each node the question with the highest overall score is used.

10. A memory for storing data for access by an application program being executed on a data processing system, whereby a decision tree for storing speech models is stored, and wherein the decision tree comprises:
    a root node containing a question about a context of a phoneme;
    a plurality of non-leaf child nodes containing additional questions, wherein the additional questions include at least one eigen dimension question; and
    a plurality of leaf child nodes containing speech models.

* * * * *